United States Patent [19]

Sullivan

[11] Patent Number: 5,051,844
[45] Date of Patent: Sep. 24, 1991

[54] DIGITAL HALFTONING WITH ERROR DIFFUSION

[75] Inventor: James R. Sullivan, Spencerport, N.Y.

[73] Assignee: Eastman Kodak Company, Rochester, N.Y.

[21] Appl. No.: 303,205

[22] Filed: Jan. 30, 1989

[51] Int. Cl.[5] ............................................. H04N 1/40
[52] U.S. Cl. ..................................... 358/456; 358/455; 358/443
[58] Field of Search ................. 358/456, 455, 448, 459, 358/443, 457, 458, 460, 75, 80, 78; 382/54

[56] References Cited

U.S. PATENT DOCUMENTS

| | | | |
|---|---|---|---|
| 4,339,774 | 7/1982 | Temple | 358/456 |
| 4,449,150 | 5/1984 | Kato | |
| 4,654,721 | 3/1987 | Goertzel et al. | 358/459 |
| 4,667,237 | 5/1987 | Yokomize | 358/464 |
| 4,668,995 | 5/1987 | Chen et al. | 358/459 |
| 4,733,230 | 3/1988 | Kurihara et al. | 358/456 |
| 4,811,108 | 3/1989 | Namakura et al. | 358/456 |
| 4,811,239 | 3/1989 | Tsao | 358/456 |
| 4,833,546 | 5/1989 | Namakuba et al. | 358/456 |
| 4,876,610 | 10/1989 | Ohsawa et al. | 382/54 |
| 4,878,125 | 10/1989 | Katayama et al. | 358/443 |
| 4,920,501 | 4/1990 | Sullivan et al. | 382/52 |

FOREIGN PATENT DOCUMENTS

| | | |
|---|---|---|
| 0208919 | 6/1986 | European Pat. Off. |
| 0295105 | 6/1988 | European Pat. Off. |
| 63-155956 | 6/1988 | Japan |
| 2011759 | 12/1978 | United Kingdom |

OTHER PUBLICATIONS

M. A. Georgeson et al., "Contrast Constancy: Deblurring in Human Vision by Spatial Frequency Channels". Article, "Digital Halftoning of Images", by Anastassiou & Pennington, IBM, Res. Dev., vol. 26, No. 6.

Primary Examiner—Joseph A. Orsino
Assistant Examiner—Thomas D. Lee
Attorney, Agent, or Firm—Dennis R. Arndt

[57] ABSTRACT

A halftoning method for creating a binary image from a continuous-tone image or computer generated graphics signal is improved by including the human visual blur function in a recursive error propagation algorithm so that perceived error rather than binary error is propagated.

9 Claims, 5 Drawing Sheets

DIGITAL HALFTONING WITH ERROR DIFFUSION

TECHNICAL FIELD

The present invention relates to the field of digital image processing and more particularly to a method for digital halftoning continuous-tone images using error diffusion.

BACKGROUND ART

Digital halftoning is a technique employing digital image processing to produce a halftone output image from a continuous-tone input image. In the digital halftoning technique, a continuous-tone image is sampled, for example with a scanner, the samples are digitized and stored in a computer. The digitized samples or pixels consist of binary representations of scanned gray level values typically ranging from 0 to 255. To reproduce this image on a printer capable of printing dots of only one gray level (e.g. black) it is necessary to create the sensation of gray levels by suitably distributing the printed dots in the output image. The continuous-tone input image is converted to a binary output image, that is a pattern of "1's" and "0's" where the "1's" represent a dot and the "0's", represent the absence of a dot to be produced by the output printer. One prior art method of digital halftoning, called error diffusion, distributes the dots in the output image by selecting for each continuous-tone input pixel a binary output pixel (or patterns of output pixels) according to an error criterion. After selecting the binary output value, the error between the continuous-tone input value and the binary output value is determined. This error is then propagated to neighboring pixels to be employed in the error criterion. A variety of methods have been employed for allocating the distribution of error to neighboring pixels. Most of these methods produce a visible artifact called "worms" in the image as a result of the propagation of the errors through the image as it is processed line by line. Most of the methods also reduce the resolution of the image.

U.S. Pat. No. 4,654,721 issued Mar. 31, 1987 to Goertzel et al. is directed to providing a solution for these problems in an error diffusion technique where each input pixel is represented by a block of output pixels. Goertzel et al. avoid the appearance of worms by employing a random number generator to determine the distribution of error between two adjacent blocks of pixels, such that a random fraction of error is distributed to one block and the remainder of the error is distributed to the other. In another technique sometimes called error diffusion with dither, the error criterion is randomly varied to reduce the appearance of worms.

Although the techniques described above reduce the appearance of worms they also increase the random noise in the output image. To the extent that this random noise occurs in the frequencies visible to the human viewer, the image is thereby degraded.

It is the object of the present invention to provide an improved error diffusion digital halftoning technique that avoids the problems noted above.

SUMMARY OF THE INVENTION

The object of the present invention is achieved by employing a human visual system response function in the error propagation step of the error diffusion technique, such that visually perceived error is propagated rather than absolute mathematical error as in the prior art. By propagating only visually perceptible error, worm patterns that develop in the conventional error diffusion techniques, and visible noise generated by the random dithering techniques are suppressed. High frequency binary errors that are not visible to the human observer are ignored.

In a preferred mode of practicing the invention, a neighborhood of previously selected output pixels and each of the binary choices for the current pixel are weighted by a human visual system filter, then the absolute value of the filtered output image subtracted from the input image is employed to compute each error. The output value is determined by comparing the error produced if the output were a "1" with the error if the output were a "0". The output that produces the least visible error is selected and this visible error is propagated.

In a further refinement of the invention, the appearance of edge sharpness is improved by detecting edges in the input image and temporarily truncating the propagation of error at the detected edge. The invention is readily extended to treating color images by applying the method to each color component of the color digital image.

MODES OF CARRYING OUT THE INVENTION

Figure 1:
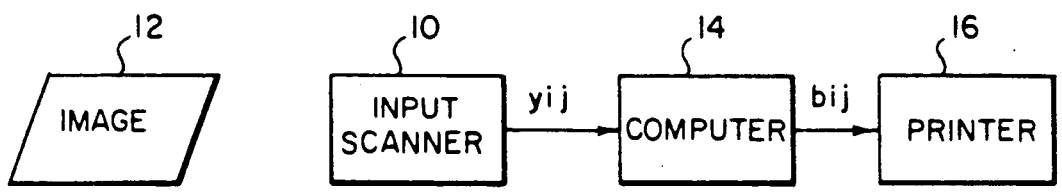
FIG. 1 is a block diagram of a digital image processing system for practicing the present invention.

The method of the present invention involves forming a causal or half-plane estimate of the human visual blur function and using it in a recursive manner to produce the output halftone image that has minimum diffused perceptual error. The estimate of the visual blur will be described first, followed by a description of its use in the present invention.

There have been numerous studies on the characteristics of the human visual system. The key feature of the vision system appropriate to the present invention is the two-dimensional visual blur function or its Fourier equivalent the modulation transfer function, MTF, which describes the visual response to suprathreshold signals. If the vision system is linear for small signal modulation, which has been demonstrated by many investigators to be accurate for modulations less than 20% (see, for example, "Contrast Constancy: Deblurring in Human Vision by Spatial Frequency Channels" by M. A. Georgeson and G. D. Sullivan, Journal of Physiology, Vol. 252, 1975, pp. 627–656), and shift-invariant or nonadaptive which has been shown to be the case for normal light levels, then the MTF can be modeled by the constant contrast sensitivity function or CSF of high luminance, threshold-detection studies. The functional relationship used for this is $$MTF(f_v) = \begin{cases} a(b + cf_v)e^{-(cf_v)^d}, & f_v > f_{max} \\ 1.0, & \text{else,} \end{cases} \quad (1)$$

where the constants a, b, c, d can be calculated by regression fits of horizontal and vertical threshold modulation data to be 2.2, 0.192, 0.114, and 1.1 respectively, $f_v$ is in cycles/(visually subtended angle in degrees) in any direction, and the typical low frequency falloff of CSF data has been eliminated by setting the MTF to 1.0 for all frequencies below the peak fmax of the functional fit. To convert this function to two-dimensions, the well known decrease in sensitivity at angles other than horizontal and vertical is used. This is modeled by scaling the spatial frequency $f_v$ such that $f_v \rightarrow f_v/s(\theta)$ where $$s(\theta) = \frac{(1-w)}{2}\cos(4\theta) + \frac{(1+w)}{2}, \quad (2)$$

and the constant w is chosen from empirical data to be 0.7 which produces an effective bandwidth reduction at 45 degrees of 70%. The last step is to convert from cycles/mm to cycles/visual degree on the document so that the visual blur function can be implemented in terms of image frequencies. This is accomplished by the geometrical optics transformation $$f_v = (\pi/180)\frac{1}{\arcsin\left(\frac{1}{\sqrt{1+dis^2}}\right)}(f_i^2 + f_j^2)^{\frac{1}{2}} \quad (3)$$

where dis is the viewing distance in mm, $f_i, f_j$ are the discrete horizontal and vertical document frequencies in cycles/mm given by $$f_j = \frac{j-1}{\Delta N}, f_i = \frac{i-1}{\Delta N}; i,j = 1,2\ldots,32, N = 32, \text{ and}$$

$$\theta = \arctan(f_j/f_i),$$

$\Delta$ is the sample spacing on the document. By implementing these equations with a viewing distance of 254 mm and the aforementioned constants for a, b, c, d, and w, a 32×32 discrete visual MTF for a sample pitch of 16 samples/mm was generated and the corresponding discrete blur function or inverse DFT was calculated from the MTF. The central causal section (i.e. the portion that includes the processed portion of an image that is being processed line by line from left to right and top to bottom plus the current pixel) of this blur function is shown unnormalized in Table I and its use in the recursive halftoning technique of the present invention will be described now.

TABLE I

| CAUSAL PORTION OF HUMAN VISUAL SYSTEM BLUR | | | | | | |
|---|---|---|---|---|---|---|
| −5.8 | −6.6 | 2.8 | 13.6 | 2.8 | −6.6 | −5.8 |
| −6.6 | −12.1 | 4.6 | 33.2 | 4.6 | −12.1 | −6.6 |
| 2.8 | 4.6 | 51.8 | 124.0 | 51.8 | 4.6 | 2.8 |
| 13.6 | 33.2 | 124.0 | 240.4 | | | |

A digital image processing system for implementing the halftone method of the present invention is shown schematically in FIG. 1, and includes an input means 10 such as a scanner or solid state image sensor for sampling and digitizing a continuous-tone image 12 such as a photograph or scene. The continuous-tone digital image $y_{i,j}$ is supplied to a computer 14 where it is processed according to the present invention to produce a binary image $b_{i,j}$ for printout on a printer 16 such as an ink jet, dot matrix, thermal or laser electrophotographic printer.

The digital image $y_{i,j}$ may be represented by a series of gray level pixel values arranged in an array of J lines each containing I pixel values.

Figure 2:
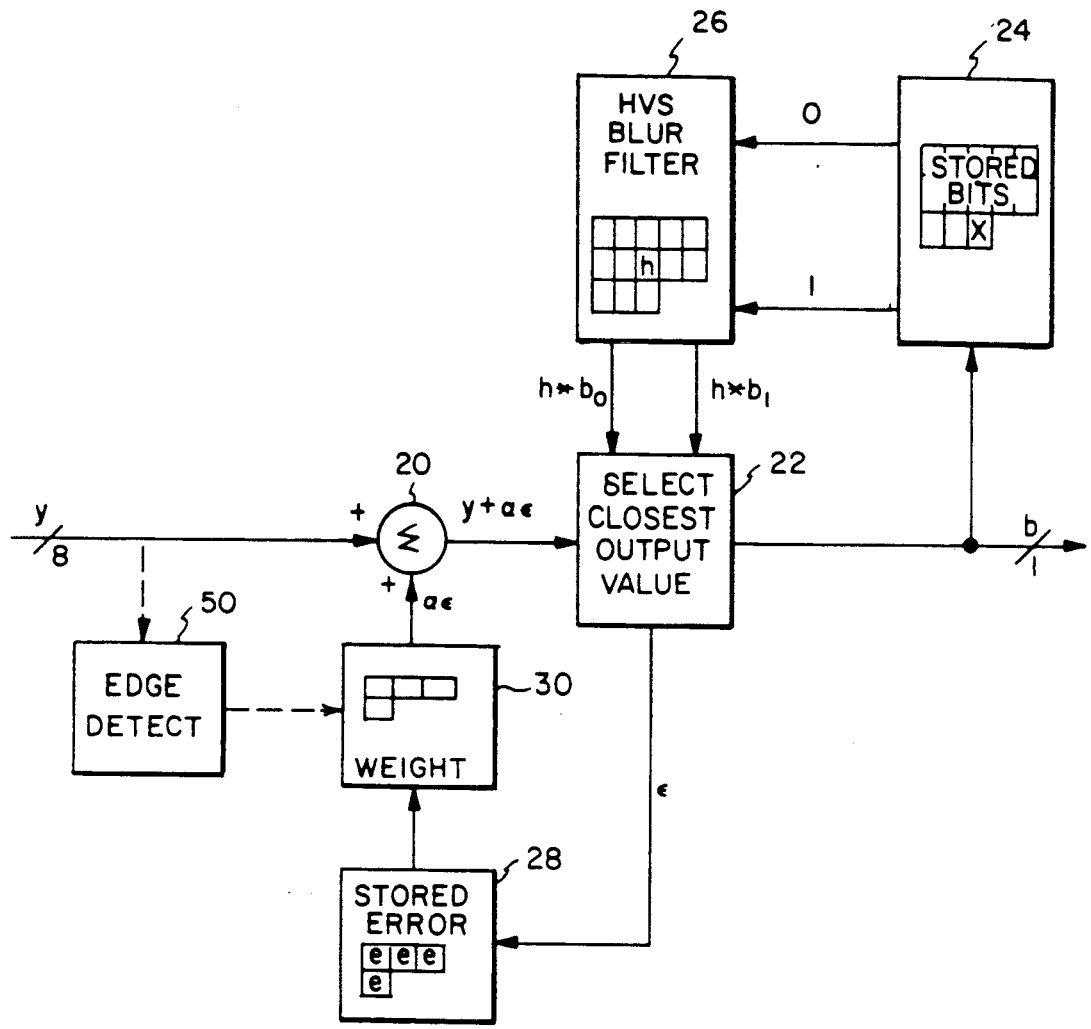
FIG. 2 is a schematic block diagram illustrating the steps employed in the error diffusion technique of the present invention.

Referring to FIG. 2, the method for carrying out error diffusion according to the present invention will now be described. Input pixel values y typically expressed as 8-bit integer values in the range from 0 to 255 are sequentially processed, one line at a time from left to right, and top to bottom of the image. For each input pixel value y, a weighted past error $\alpha\epsilon$ is added (20) to the input pixel value. The sum $(y+\alpha\epsilon)$ is compared with a pair of visually blurred values $(h*b_o)$ and $(h*b_1)$ of the output image to select (22) a closest output value b. The visually blurred value $(h*b_o)$ is produced by inserting a "0" at the current pixel location in an array 24 of previously selected and stored output values, and filtering 26 the resulting array with the digital blur filter h representing the discrete blur function of the human visual system. Likewise, the visually blurred value $(h*b_1)$ is produced by inserting a "1" at the current pixel location in the array and filtering with the blur filter h.

The selection criterion (22) is expressed as $$b = \begin{cases} 0, & |y - h*b_o + \alpha\epsilon|^P < |y - h*b_1 + \alpha\epsilon|^P, \\ 1, & |y - h*b_o + \alpha\epsilon|^P \geq |y - h*b_1 + \alpha\epsilon|^P. \end{cases} \quad (4)$$

where y is the input signal, $b_o$ and $b_1$ are the past output binary values combined with a 0 and a 1, i.e. "off" or "on", at the current pixel and $| \ |$ is absolute value. The propagated error $\epsilon$ which depends on the choice is then $$\epsilon = \begin{cases} y - h*b_o + \alpha\epsilon, & b = 0 \\ y - h*b_1 + \alpha\epsilon, & b = 1 \end{cases} \quad (5)$$

The error value $\epsilon$ represents the amount of visible error between the continuous input pixel, and the output image with either a "0" or a "1" in the current output pixel location. If $h = \delta$ and $P = 2$ such that there is a 1 at the current pixel and 0's at all past pixels equations (4) and (5) reduce to conventional absolute mathematical error diffusion.

Figure 3:
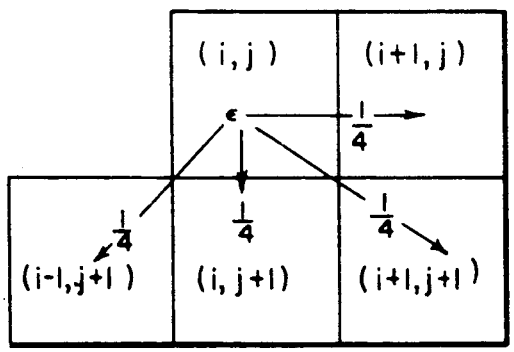
FIG. 3 is a diagram useful in describing the diffusion of errors in the error diffusion process.

The error value $\epsilon$ is stored in an array of past error values (28). The past error values are weighted and summed (30) to produce the diffused error value $\alpha\epsilon$ for the next pixel value y. FIG. 3 illustrates the manner in which the error is diffused from neighboring pixels. The visual error $\epsilon$ at pixel location (i,j) is weighted by one-fourth and distributed to future pixels $(i+1,j)$ $(i-1,j+1)$, $(i,j+1)$, and $(i+1,j+1)$.

This particular distribution scheme is not essential to a practice of the invention, and other error distribution schemes as known in the prior art may be employed. The selected bit b is sent to the printer 16, and is placed with the stored bits 24.

Figure 4:
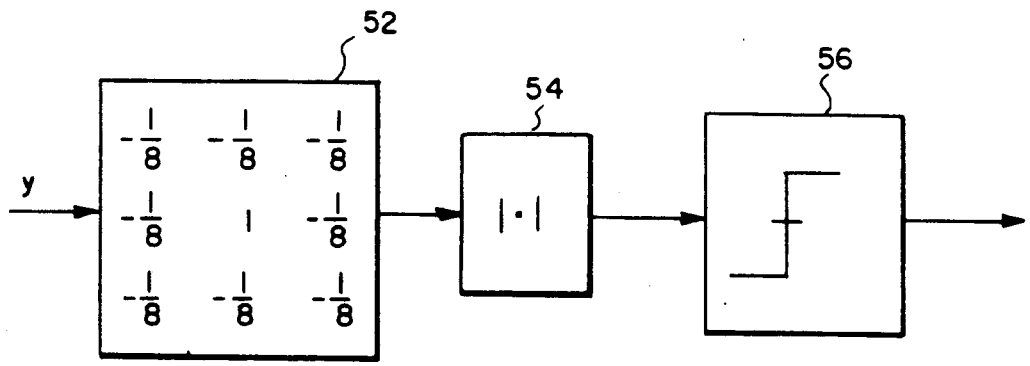
FIG. 4 is a schematic block diagram illustrating the steps of edge detection in a refinement of the present invention.

According to a further refinement of the present invention, an improvement in image sharpness can be achieved by detecting edges in the input image and temporarily truncating the propagation of errors at the detected edge. An edge detection step 50 is incorporated into the method as shown in FIG. 2. As shown in FIG. 4, the edge detection can be accomplished, for example, with a 3×3 digital filter 52 having coefficient weights as shown, followed by an absolute value 54 and a threshold detection step 56. A detection step of 5 counts works satisfactorily. When an edge is sensed, a signal is sent to the weight matrix 30 to set the error weights to zero for that pixel.

In both equations (4) and (5), if an edge is sensed in the input data the error propagation is truncated and $\alpha\epsilon$ is set to zero for that pixel. The effect of including the blur function is to break-up the error diffusion "worms" or patterns. As a verification of the image quality advantages of the present invention, a 400 dot/inch, monochrome image that included man-made clustered-dot and natural structures was half-toned with 8×8 dither, four-term error matrix and twelve-term error matrix error diffusion where the four-term algorithm included a dither threshold matrix to help break-up the "worms", and the present recursive visual algorithm. Visual analysis by a number of experienced viewers indicated a strong preference for the image generated by the method of the present invention, and a quantitative justification for this is given in Table II where the rms errors between the input image and blurred binary images for each algorithm are shown.

TABLE II

| Halftoning Method | RMS Error (8-Bit Counts) |
| --- | --- |
| 8 × 8 clustered-dot dither | 26.5 |
| error diffusion 4-term with dither | 17.2 |
| error diffusion 12-term without dither | 14.3 |
| recursive visual (present invention) | 12.8 |

Figure 5A:
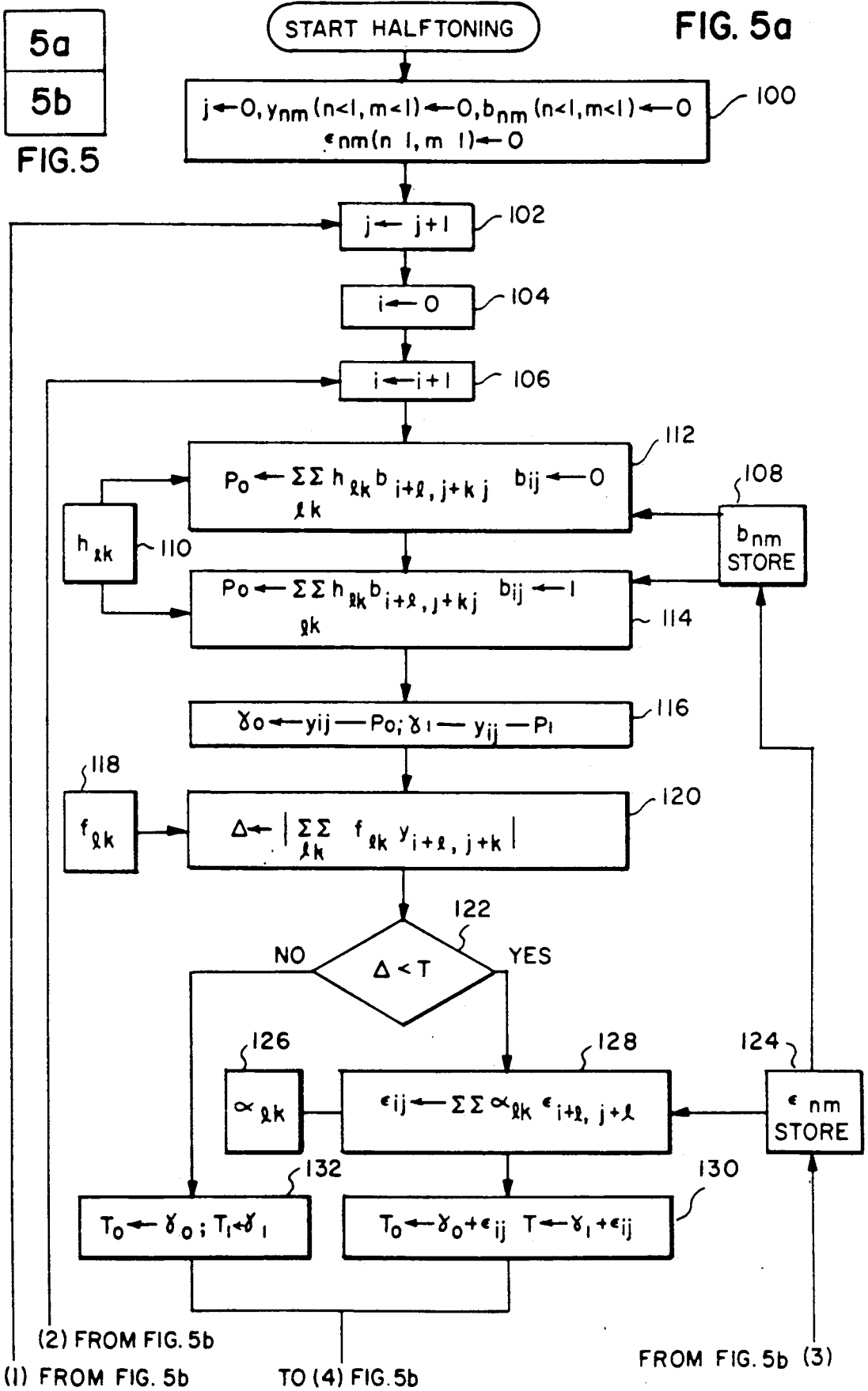
FIGS. 5A and 5B are flow charts illustrating a computer program for practicing the method of the present invention.
Figure 5B:
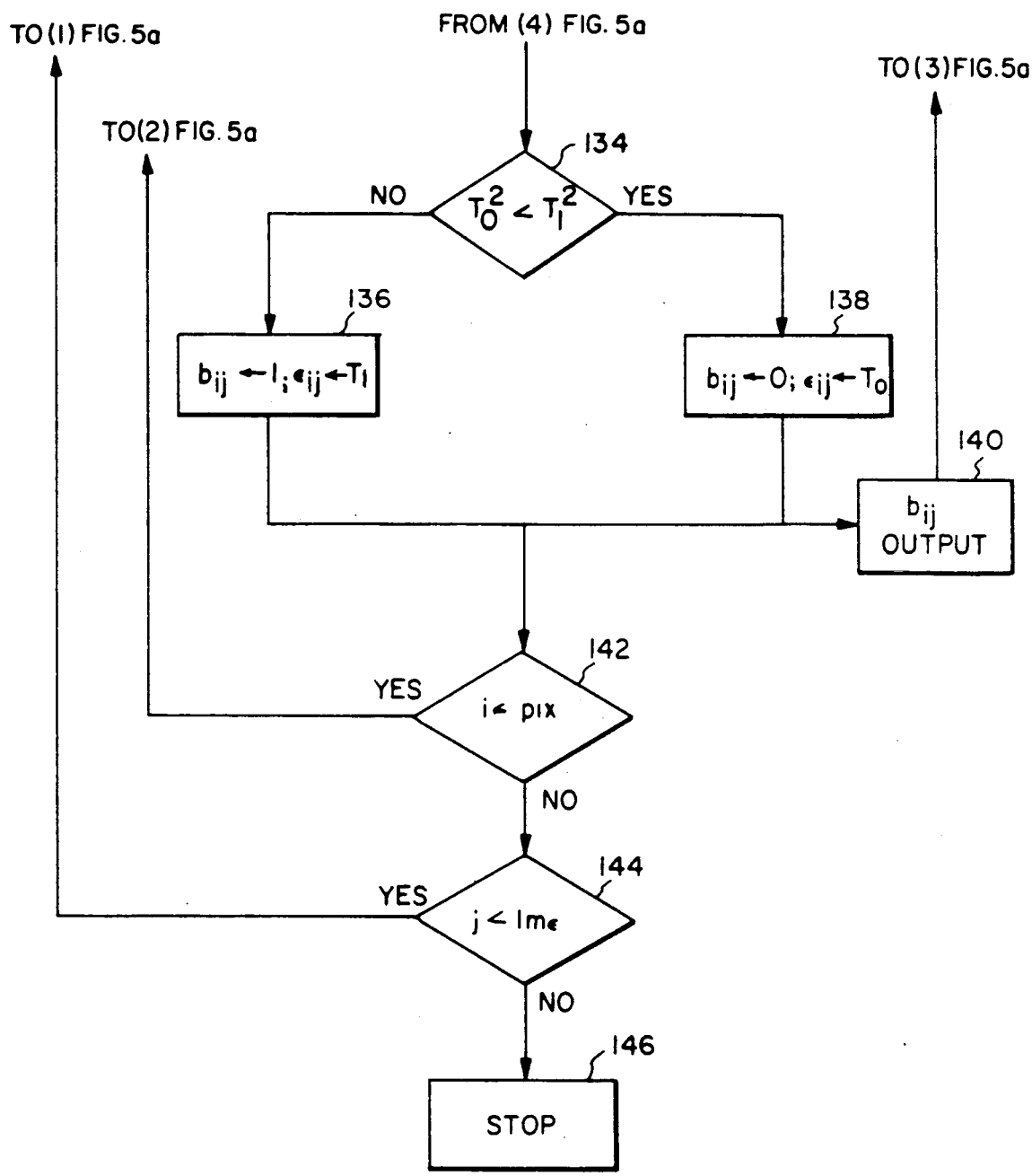

A program for programming a microprocessor to perform the halftone process will now be described with reference to the flow chart in FIG. 5. At the start of scan, the internal counter j for the line number and i for the pixel number are initialized and the non-image, i.e. (n<1,m<1), input, output, and error boundaries $y_{nm}$, $b_{nm}$, and $e_{nm}$ are set to zero (100, 104). The pixel and line counters are incremented by one (102, 106). Past output binary values $b_{nm}$;n<i,m<j are combined with a current binary value of zero and the weighted sum perceived value $P_o$ is calculated (108, 110, 112). Past output binary values $b_{nm}$;n<i,m<j are combined with a current binary value of one and the weighted sum perceived value $P_1$ is calculated (108, 110, 114). Differences $\gamma_o$ and $\gamma_1$ between the input value and perceived values are calculated (116). The input image is filtered to determine the signal contrast $\Delta$ at the current pixel (118, 120) and compared with a fixed threshold value T (122) to determine if the current pixel is an edge pixel or not. If the contrast $\Delta$ is less than the threshold an edge does not exist and past errors are weighted and summed (124, 126, 128) and added to the differences $\gamma_o$ and $\gamma_1$ to calculate the total errors $T_o$ and $T_1$ (130). If the contrast is greater than the threshold an edge exists and the past errors are ignored (132). The total errors are squared and compared (134). If the total square error for setting the current pixel to 0 is less than the total square error for setting the current pixel to 1, then the output is set to 0 and the current error is set to $T_o$ (136). Else the output is set to 1 and the current error is set to $T_1$ (138). The output is passed to a memory or writing device (140) and the output and error are stored (108, 124). A check is made for the end of line (142) and end of image (144). If not the end, the appropriate counters are reset or incremented, else the processing is complete and the halftoning stops (146).

A non-linear extension of the present invention will now be discussed. The appearance of the output binary image in terms of noise, sharpness, and contrast is somewhat dependent on the signal domain in which the method of the present invention is implemented. Preference can be given to the contrast of high or low input values by preceding the recursive visual algorithm by a non-linear transformation or look-up-table that converts the multi-bit input values into a signal domain that is more like the response of the vision system. Such a look-up table 150 is shown in phantom in FIG. 2. For linear scanned values a logarithmic transformation or a power law transformation would be examples. Performing the halftoning in this transformed signal domain will not preserve tonal fidelity because the output binary image will be unbiased with respect to the transformed signal levels, but such signal transformation can produce images with more pleasing contrast.

Figure 6:
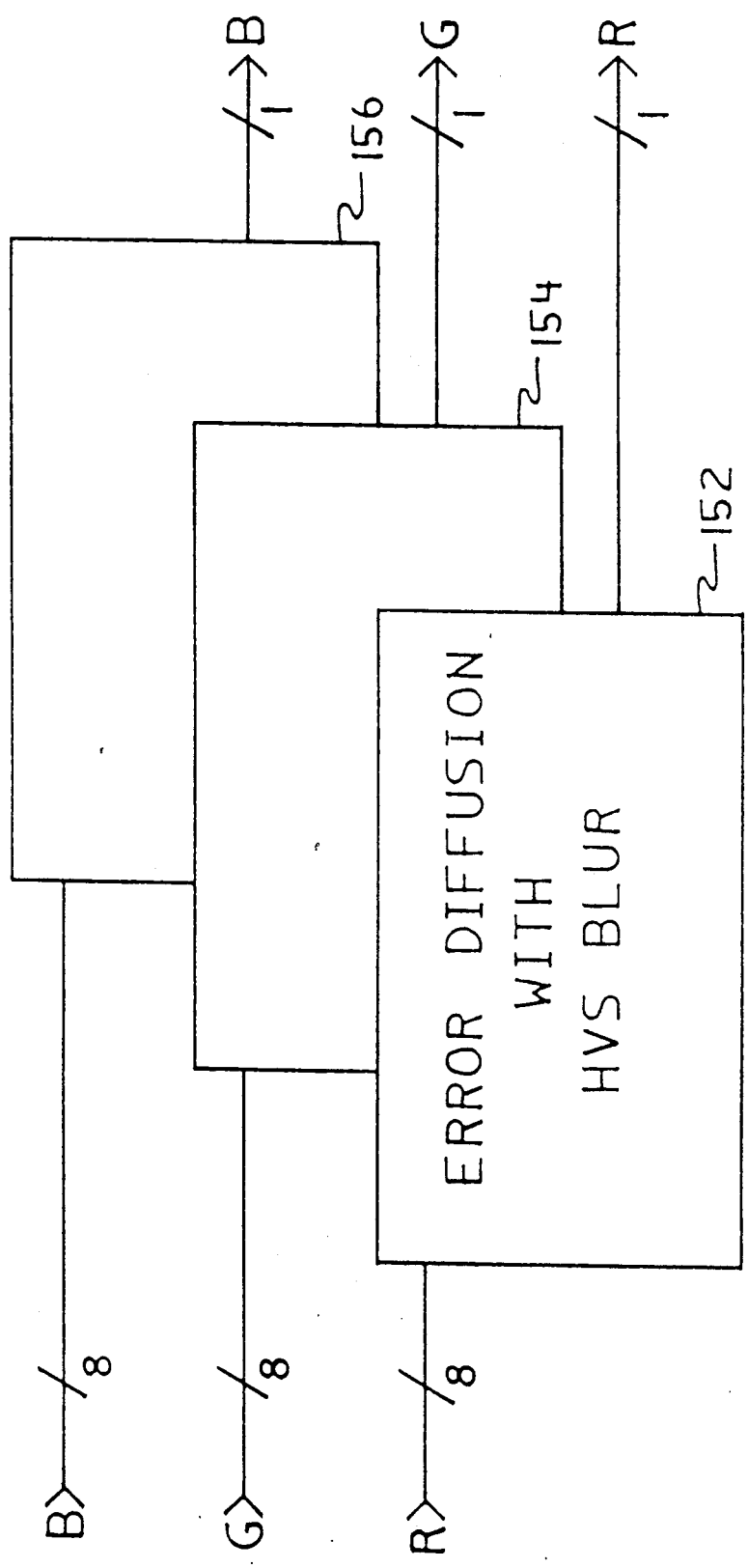
FIG. 6 is a block diagram showing error diffusion with HVS blur operating on the color components of a color image.

The present invention is readily extended to halftoning color images, by applying the halftoning process to each color component of a digital color image. Since the response of the human visual system is different for different color components, the blur function can be customized for each color component. A block diagram of such a color halftoning method is shown in FIG. 6, where a separate error diffusion with HVS blur is performed (152, 154 and 156) on the red, green and blue (R,G,B) color components respectively of a color image.

INDUSTRIAL APPLICABILITY AND ADVANTAGES

The halftoning technique of the present invention is useful in systems that generate binary outputs from continuous-tone input images or computer generated graphics. The invention has the advantage that it is optimal in terms of perceived noise in constant signal regions and does not produce the periodic patterns of standard error diffusion or introduce white noise as in the process of randomly varying coefficient weights. It also has significant implementation advantages over conventional error diffusion because it does not require real multiplications. The weighting coefficients for the error propagation are simply bit shifts because they represent the average of four neighboring errors, and since the blur calculation is performed on the output binary signal it is merely a selective sum of the blur coefficients governed by whether a particular output value is a 0 or a 1. To achieve similar image quality, prior art error diffusion algorithms either have to have large error matrices, and therefore large storage and calculation requirements or adhoc algorithm modifications such as randomly perturbing the error coefficients to reduce the correlated noise that add complexity and are visually suboptimal.

I claim:

1. An improved error diffusion method for producing a halftone image from a continuous-tone image having pixels which have been digitized as grey scale values, and including the steps of selecting for each continuous-tone input pixel a binary output pixel(s) according to an error criterion, determining an error between an input pixel value and an output pixel(s) value and distributing the error to a neighborhood of adjacent input pixels, for use in the error criterion, wherein the improvement comprises:

employing a neighborhood of previously selected output pixels and a currently selected pixel, all weighted by a human visual system filter as the output pixel value employed in the error determining step.

2. An improved error diffusion method for producing a halftone image from a continuous-tone image having pixels which have been digitized as grey scale values, and including the steps of selecting for each continuous-tone input pixel a binary output pixel(s) according to an error criterion, determining an error between an input pixel value and an output pixel(s) value and distributing the error to a neighborhood of adjacent input pixels, for use in the error criterion, the improvement comprising:

employing a neighborhood of previously selected output pixels and a currently selected pixel, all weighted by a human visual system filter as the output pixel value employed in the error determining step;

wherein said error criterion is $$b = \begin{cases} 0, & |y - h*b_o + \alpha\epsilon|^P < |y - h*b_1 + \alpha\epsilon|^P, \\ 1, & |y - h*b_o + \alpha\epsilon|^P \geq |y - h*b_1 + \alpha\epsilon|^P. \end{cases}$$

where $|\ |$ is absolute value, b is an output binary value, y is an input continuous-tone value, $h*b_o$ is the output of the human visual system filter applied to a neighborhood of previously determined output pixel values with a "0" at a present pixel location, $h*b_1$ is the output of the human visual system filter applied to the neighborhood of previously determined output pixel values, with a "1" at the present pixel location, and $\alpha\epsilon$ is a weighted error contribution from a neighborhood of adjacent pixels.

3. The method claimed in claim 2, wherein said human visual system filter is a digital filter having the weights:

| −5.8 | −6.6 | 2.8 | 13.6 | 2.8 | −6.6 | −5.8 |
|---|---|---|---|---|---|---|
| −6.6 | −12.1 | 4.6 | 33.2 | 4.6 | −12.1 | −6.6 |
| 2.8 | 4.6 | 51.8 | 124.0 | 51.8 | 4.6 | 2.8 |
| 13.6 | 33.2 | 124.0 | 240.4 | | | |

4. The method claimed in claim 3, wherein said error $\epsilon$ is $(y - h*b_i + \alpha\epsilon)$, where $b_i$ represents the selected output pixel, and the error is distributed to the neighboring pixels in a rectangular array as follows:

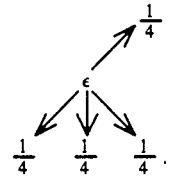

5. The method claimed in claim 1, further comprising the steps of:

detecting an edge in an input image and temporarily interrupting error propagation when such an edge is detected.

6. The method claimed in claim 5, wherein edges are detected with a digital filter of the form:

$$\begin{array}{ccc} -\frac{1}{8} & -\frac{1}{8} & -\frac{1}{8} \\ -\frac{1}{8} & 1 & -\frac{1}{8} \\ -\frac{1}{8} & -\frac{1}{8} & -\frac{1}{8} \end{array}.$$

7. An improved error diffusion method for producing a halftone image from a continuous-tone image having pixels which have been digitized as grey scale values, and including the steps of selecting for each continuous-tone input pixel a binary output pixel(s) according to an error criterion, determining an error between an input pixel value and an output pixel(s) value and distributing the error to a neighborhood of adjacent input pixels, for use in the error criterion, the improvement comprising:

employing a neighborhood of previously selected output pixels and a currently selected pixel, all weighted by a human visual system filter as the output pixel value employed in the error determining step; and wherein a non-linear transformation such as a logarithmic or power law transformation is performed on the continuous tone image prior to the error diffusion method.

8. The method claimed in claim 2, performed independently on each color component of a continuous-tone color image.

9. The method claimed in claim 8, wherein the human visual system filter is customized for each color component.

* * * * *